Nov. 22, 1960
H. N. IPSEN
2,961,005
GAS MIXING DEVICE
Filed April 11, 1957
2 Sheets-Sheet 1
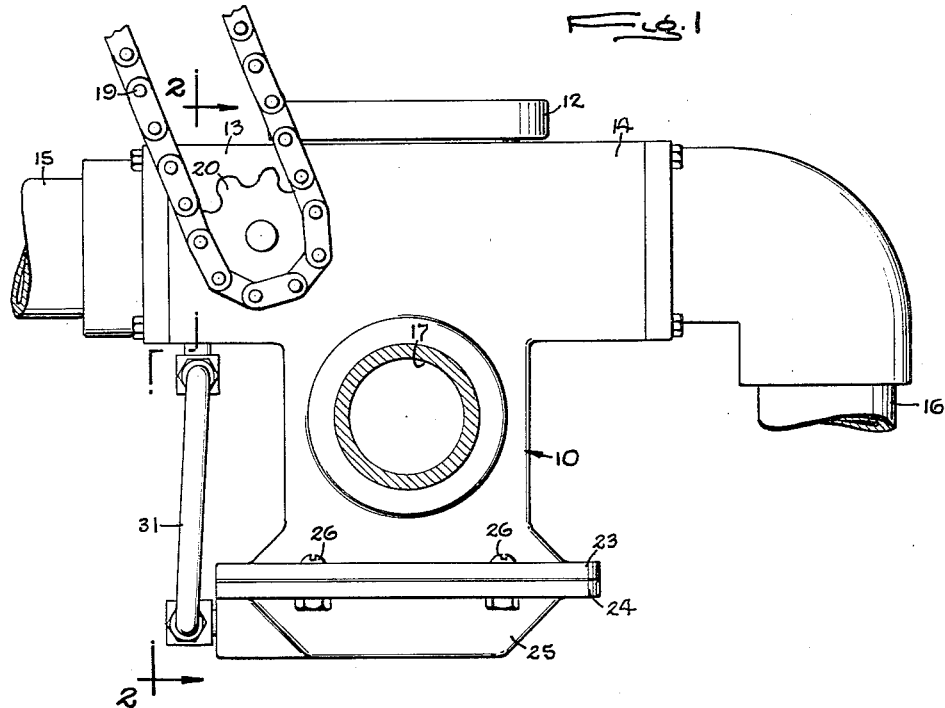
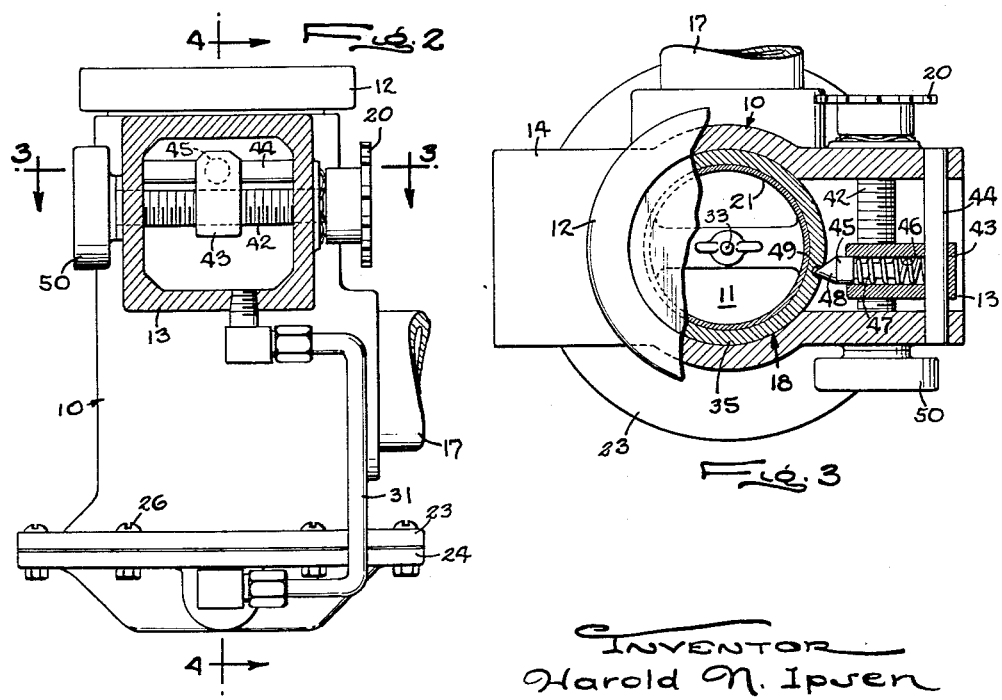
INVENTOR
Harold N. Ipsen
by Carlson, Pitzner, Hubbard & Wolfe
ATTORNEYS

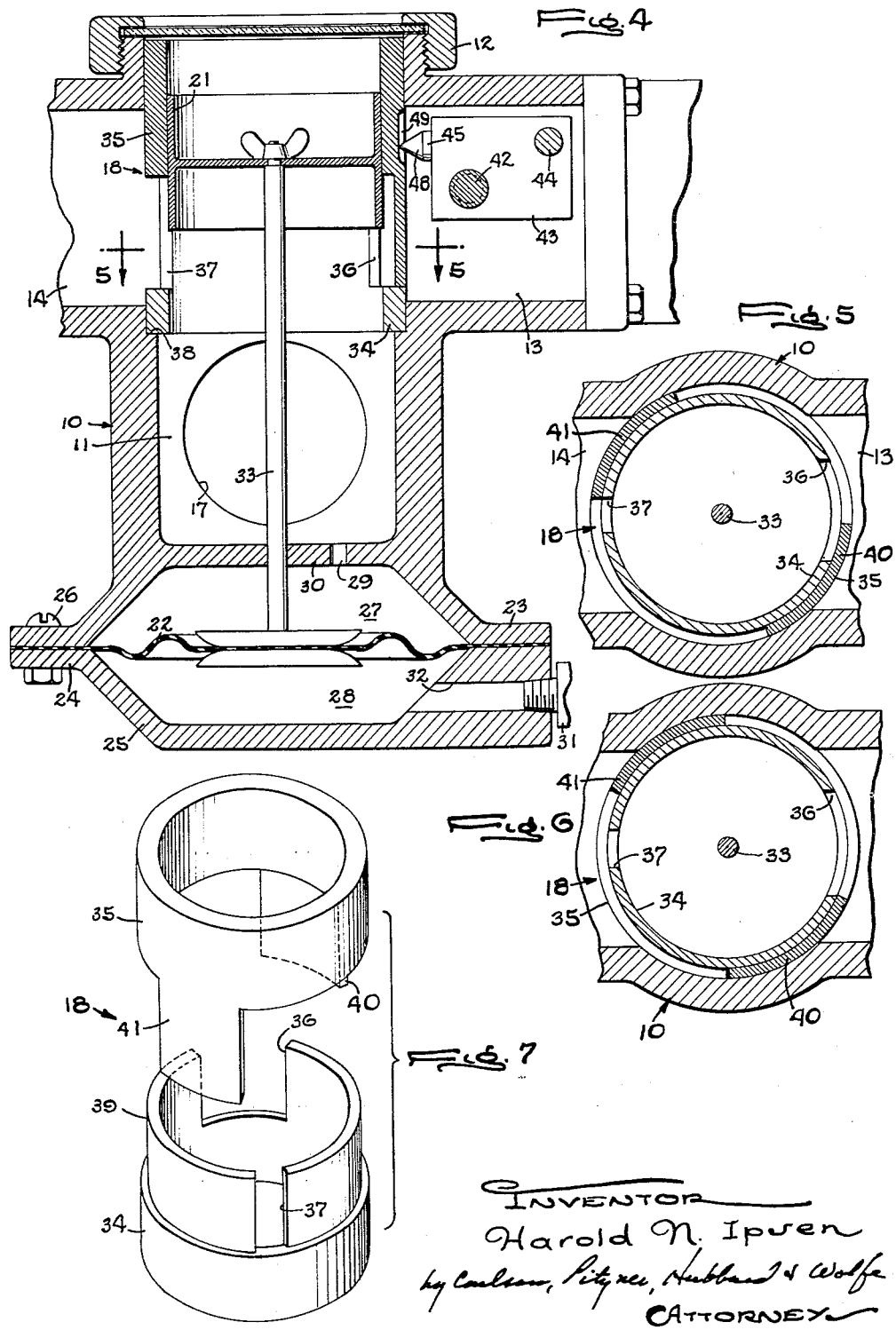

2,961,005
Patented Nov. 22, 1960

2,961,005
GAS MIXING DEVICE

Harold N. Ipsen, % Ipsen Industries, Inc., 715 S. Main St., Rockford, Ill.

Filed Apr. 11, 1957, Ser. No. 652,299

3 Claims. (Cl. 137—625.41)

This invention relates to gas mixing devices and particularly to devices for mixing air and a gas such as propane or a natural gas to produce a mixture which may be used in heat treating metal parts. For such a use, it is important to maintain the dew point of the mixture at a desired value and the mixing device, therefore, functions to regulate the dew point by appropriately varying the ratio of air and gas in the mixture.

The general object of the invention is to provide a new and improved gas mixing device which, as compared to prior devices of this type, provides a finer adjustment of the ratio of air and gas and hence more precise control over the dew point of the resulting mixture.

A more detailed object is to obtain the adjustment of the ratio through the use of two relatively rotatable sleeves which cooperate to form the inlet ports for the air and gas and which, when turned relatively to each other, vary the size of one of the ports and hence the amount of the corresponding component of the mixture entering through that port.

Other objects and advantages of the invention will become apparent from the following detailed description taken in connection with the accompanying drawings, in which Figure 1 is a side elevation of a mixing device embodying the novel features of the present invention.

Fig. 2 is a sectional view taken along the line 2—2 in Fig. 1.

Fig. 3 is a sectional view taken along the line 3—3 in Fig. 2.

Fig. 4 is an enlarged sectional view taken along the line 4—4 in Fig. 2.

Fig. 5 is a fragmentary sectional view taken along the line 5—5 in Fig. 4.

Fig. 6 is a view similar to Fig. 5 but shows the parts in a different position.

Fig. 7 is an exploded perspective view of the sleeves.

As shown in the drawings for purposes of illustration, the invention is embodied in a device for proportioning the flow of air and a gas, such as propane or a natural gas. The mixture of the two may be directed to a gas generator which converts the mixture into a non-oxidizing gas as is commonly used in heat treating metals. Usually in such cases the dew point of the resulting non-oxidizing gas is controlled and this is effected by regulating the ratio of air and gas in the mixture. To lower the dew point, the proportion of gas is increased and vice versa. The mixing device herein disclosed performs this regulating function automatically under the control of a sensing mechanism (not shown) which is responsive to the dew point of the air and gas mixture and which operates the mixing device to regulate the proportion and produce the desired dew point.

In the present instance, the mixing device comprises an elongated hollow body or casting 10 having an axial passage 11 (Fig. 4) therein with a cap 12 threaded onto the top of the body to close the upper end of the passage. Two inlets 13 and 14 disposed on opposite sides of the body open laterally into the passage 11 near the upper end thereof and are connected respectively to air and gas supplies (not shown) through pipes 15 and 16. The mixture of gas and air leaves the body through an outlet 17 opening laterally from the body near the lower end of the passage 11.

The ratio of air and gas entering the passage 11 through the inlets 13 and 14 is controlled by a valve 18 (Fig. 4) which is operated by the dew point sensing mechanism through a chain 19 and a sprocket wheel 20 (Fig. 1). The volume of the mixture is regulated by a cylindrical plunger 21 (Fig. 4) which is disposed within the body 10 and slides axially in the passage to cover and uncover the inlets 13 and 14. Such sliding of the plunger is controlled by the pressure of the air and gas mixture in the passage 11 through the use of a diaphragm 22 which is responsive to this pressure.

Herein, the diaphragm is clamped between an annular flange 23 on the lower end of the body 10 and a mating flange 24 on a casting 25, the two flanges being held together by bolts 26. The body 10 and the casting 25 form a chamber 27 above the diaphragm and a chamber 28 below. The upper chamber 27 communicates with the passage 11 through a hole 29 in the bottom wall 30 of the body 10 and the lower chamber 28 communicates with the air supply inlet 13 through a pipe 31 (see Fig. 1) and a small passage 32 in the casting 25. The diaphragm is connected to the plunger 21 through a rod 33 so that movement of the diaphragm is transmitted to the plunger.

With the foregoing arrangement, the upper side of the diaphragm 22 is subjected to the pressure of the mixture of air and gas while the lower side is subjected to the pressure of the air supply. Should the quantity of the mixture leaving the body 10 be inadequate, the pressure above the diaphragm will be less than normal and the diaphragm will flex upwardly. This raises the plunger 22 uncovering the inlets 13 and 14 and admitting more air and gas to the passage 11 but in the same proportion as determined by the setting of the valve 18. If the supply of the mixture becomes excessive, the pressure above the diaphragm increases lowering the plunger and tending to close the inlets.

The present invention contemplates constructing and arranging the valve 18 in a novel manner so that, as compared to prior arrangements, the valve provides a finer adjustment of the ratio of air and gas flowing through the passage 11 and hence more accurately regulates the dew point of the mixture. This is achieved by making the valve from two sleeves or cylinders 34 and 35 which cooperate to form inlet ports 36 and 37 (Fig. 5) for the air and gas and by turning the sleeves relative to each other to vary the size of only one of the ports. By regulating the supply of only one instead of both of the components of the mixture of gas and air, the relative turning of the sleeves produces a comparatively smaller change in the air and gas ratio and this results in a more accurate control of the dew point. Preferably, as shown in the drawings, the sleeves 34 and 35 regulate the supply of air.

In the present instance, the sleeve 34 is stationary and is seated on an annular shoulder 38 (Fig. 4) in the body 10 just below the inlets 13 and 14. The outside diameter of the sleeve is reduced along the upper portion 39 thereof as best shown in Fig. 7 and on diametrically opposite sides of the reduced portion 39 are slots which form the air and gas inlet ports 36 and 37. The slot 37 is comparatively narrow and is alined with the gas inlet 14 while the wider slot 36 is alined with the air inlet 13.

The other sleeve 35 is journaled in the passage 11 in the body 10 and is disposed above the sleeve 34. Flanges 40 and 41 project downwardly from the lower end of the sleeve 35 and overlap the reduced portion 39 of the sleeve 34. By turning the sleeve 35 back and forth about its axis, the flange 40 progressively covers and uncovers the slot 36 and thus varies the size of the inlet port for the air. During such turning, however, the flange 41 never covers any part of the gas inlet slot 37 which remains completely open at all times. The flanges 40 and 41 fit closely over the end portion 39 of the sleeve 34 and guide the sleeve 35 as the latter is turned.

To turn the sleeve 35, a screw 42 (Figs. 2 and 3) is journaled in the body 10 and extends across the air inlet 13 near the top thereof. A nut 43 is threaded on the screw and is held against turning by a stationary pin 44 which parallels the screw and passes through the nut. The latter carries a plunger 45 which slides in a bore 46 in the nut and is urged outwardly toward and into engagement with the rotatable sleeve 35 by a compression spring 47. The outer end 48 of the plunger is pointed and projects into a vertical notch 49 (see Fig. 4) in the sleeve 35 so that, as the screw 42 is turned, the nut 43 travels along the screw and turns the sleeve 35 through the medium of the plunger 45. The screw may be turned manually by a knurled knob 50 on one end of the screw or automatically by the chain 19 and sprocket wheel 20 which is fast on the other end of the screw.

I claim as my invention:

1. A mixing device for air and gas comprising a hollow body having an axial passage therethrough and angularly spaced gas and air inlets opening laterally into said passage, said body having an outlet leading from the passage, a stationary cylinder coaxially disposed within said passage and having one end portion seated in said body axially to one side of said inlets, the other end portion of said cylinder projecting over said inlets and having two openings, one aligned with each of the inlets, a second cylinder similarly disposed within said passage on the other side of said inlets and having two peripheral flanges projecting axially toward said stationary cylinder and closely overlying said other end portion with one of said flanges being adjacent one of said openings, said second cylinder being journaled in said passage to turn about its axis with said flanges and said other end portions being in sliding engagement so as to guide said second cylinder during such turning, and means for turning said second cylinder to progressively cover and uncover said one opening by said one flange so as to regulate the supply of one of the components of the resulting mixture of gas and air, the other of said flanges being disposed wholly to one side of the other of said openings throughout the turning of said second cylinder so as to leave said other opening unobstructed at all times.

2. A mixing device for air and gas comprising a hollow body having an axial passage therethrough and angularly spaced gas and air inlets opening laterally into said passage, said body having an outlet leading from said passage, a stationary sleeve disposed coaxially within said passage and having a first longitudinal slot aligned with said gas inlet and a second longitudinal slot aligned with said air inlet, a second sleeve coaxial with said first sleeve and mounted within said body to turn about its axis, two peripheral flanges projecting axially from one end of said second sleeve to telescope with said first sleeve and disposed in sliding engagement with the first sleeve so as to guide the turning of said second sleeve, one of said flanges overlying said second slot whereby the latter is progressively closed and opened upon turning of said second sleeve in opposite directions, and means for turning said second sleeve through a predetermined range to vary the opening of said second slot, the other of said flanges being disposed wholly to one side of said first slot throughout the turning of said second sleeve through said range so as to maintain said first slot completely open at all times and control the ratio of air and gas in said passage by regulating only the flow of air.

3. A device producing a mixture of gas and air having, in combination, a hollow body having an axial passage therethrough and angularly spaced gas and air inlets opening laterally into said passage, said body having an outlet leading from the passage, a first sleeve disposed in and coaxially with said passage and having an end portion overlying said inlets, said end portion having two openings aligned respectively with said inlets, a second sleeve similarly disposed within said passage and located beyond said end portion, said second sleeve having two longitudinally extending peripheral flanges overlapping said end portion with one of said flanges being adjacent one of said openings, said sleeves being relatively rotatable and said flanges being in sliding contact with said end portion and guiding such relative rotation, and means for rotating said sleeves relatively to each other through a predetermined angle to cause said one flange to cover said one opening partially and in varying degrees to position said one flange so as to regulate the ratio of air and gas by varying the supply of only one of the components of the mixture, the other of said flanges being disposed wholly to one side of the other of said openings throughout relative turning of said sleeves through said angle so as to leave said other opening unobstructed at all times.

References Cited in the file of this patent
UNITED STATES PATENTS

| 1,812,089 | Engels | June 30, 1931 |
| 1,980,770 | Thomas | Nov. 13, 1934 |
| 2,486,017 | Furkert | Oct. 25, 1949 |
| 2,800,923 | Russell | July 30, 1957 |